United States Patent
De Nardo

[11] 3,831,166
[45] Aug. 20, 1974

[54] DISPLAY CHARACTER PATTERN

[75] Inventor: Frank De Nardo, Villa Park, Calif.

[73] Assignee: Rockwell International Corporation, El Segundo, Calif.

[22] Filed: Mar. 16, 1973

[21] Appl. No.: 342,139

[52] U.S. Cl......... 340/336, 340/324 M, 350/160 LC
[51] Int. Cl. ................................................. G09f 9/32
[58] Field of Search.......... 350/160 LC; 340/324 M, 340/324 R, 336

[56] References Cited
UNITED STATES PATENTS

| | | | |
|---|---|---|---|
| 3,322,485 | 5/1967 | Williams | 350/160 LC |
| 3,588,225 | 6/1971 | Nicastro | 350/160 LC |
| 3,760,403 | 9/1973 | Kippenhan | 340/324 M |
| 3,781,863 | 12/1973 | Fujita | 340/336 |

Primary Examiner—John W. Caldwell
Assistant Examiner—Marshall M. Curtis
Attorney, Agent, or Firm—H. Fredrick Hamann; G. Donald Weber, Jr.

[57] ABSTRACT

A segmented character pattern for a liquid crystal display presents a centered "1" and a "4" that has intersecting vertical and horizontal bars. Electrically conductive segments on one of a pair of facing glass plates of the liquid crystal display panel cooperate with a pair of common electrodes for each such character pattern formed on the back plate of the display panel. Selective energization of one or the other of the common electrodes and a selected combination of character pattern segments of the front plate afford an increased number of configurations with a given group of character pattern segments.

3 Claims, 9 Drawing Figures

DISPLAY CHARACTER PATTERN

BACKGROUND OF THE INVENTION

1. Field of the Invention

The present invention relates to display devices and more particularly concerns an improved character pattern formed of selected combinations of character segments.

2. DESCRIPTION OF PRIOR ART

Various types of displays and, in particular liquid crystal displays, are widely employed for presenting patterns of numbers or letters. The common numeric liquid crystal display employs a seven-segmented character display in a pattern such as shown in the U.S. Pat. No. 3,674,341 to Hedman, Jr. et al. To form the desired numbers, a voltage is applied between the segment and a common electrode that entirely encompasses the area of all seven segments of the characters. In this conventional seven-segment display, the numerals "1" and "4" are formed by using the two vertical segments on the right side of the character pattern, thus making both of these numerals appear off center. Further, the horizontal and vertical lines of the "4" do not intersect as in a conventional presentation of this number.

Accordingly, it is an object of the present invention to provide an improved arrangement of character pattern segments for character display.

SUMMARY OF THE INVENTION

In carrying out principles of the present invention in accordance with a preferred embodiment thereof, a character pattern is formed of a number of character segments in which different combinations of segments form respective ones of a plurality of characters. The character pattern includes segment electrodes which are in registration with at least first and second mutually discrete common electrodes. The first common electrode is in registration with the electrodes of a first part of the character pattern and the second common electrode is in registration with the electrodes of a second part of the character pattern.

Where the various electrodes are conductive materials formed on facing inner surfaces of a pair of glass plates separated by a thin film of liquid crystal material, means are provided for selectively energizing one or the other of the common electrodes with a selected group of the character segment electrodes so as to activate the interposed liquid crystal material in a configuration that defines a selected specific figure.

DETAILED DESCRIPTION

Although the segmented character pattern described herein may be employed with a number of types of electrically activated displays, the arrangement is specifically adapted for use in a liquid crystal display and accordingly, a preferred embodiment will be described in such an application.

Figure 1:
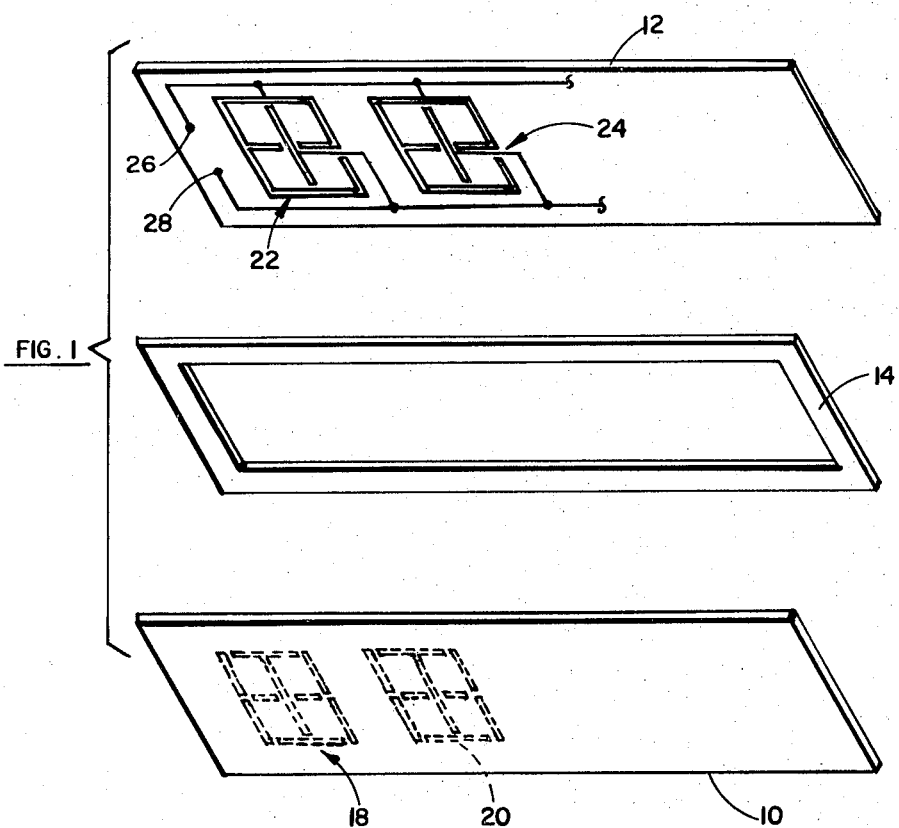
FIG. 1 is an exploded pictorial representation of basic elements of a liquid crystal display panel embodying character patterns and discrete common electrodes of the present invention.
Figure 2:
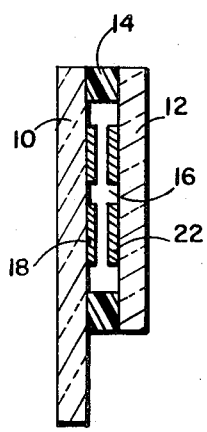
FIG. 2 is a cross-sectional view of the assembled display panel of FIG. 1.

A liquid crystal display apparatus of the type known in the art comprises first and second transparent plates 10 and 12 (FIG. 1). These plates may preferably be formed of glass. Spacer 14 cooperates with glass plates 10 and 12 to form one or more cells or chambers for the liquid crystal film 16 (FIG. 2) that is interposed between the facing inner surfaces of the two plates. In this description, liquid crystal is intended to include suspended crystal material or any similar material. A plurality of conductive character electrode segments collectively forming character patterns 18, 20 are formed on the inner surface of plate 10. The inner surface of the back plate 12 has formed thereon a plurality of pairs of common electrodes 22, 24. Conductive leads (not shown) are provided in a conventional manner to edges of plate 10 from each of the electrode segments of character patterns 18, 20 and the like. Conductive leads are provided to points 26 and 28 on back plate 12 from the first and second electrodes of each of the common electrode patterns 22, 24 and the like on the back plate. Points 26 and 28 are electrically connected through spacer 14 to conductors (not shown) on the inner surface of front plate 10, for connection to external circuitry as will be described in greater detail hereinafter. Reference is made to the copending application of Fitzgibbons and Slowinski, entitled Liquid Crystal Display Device, filed on Oct. 18, 1971, bearing Ser. No. 189,991, now U.S. Pat. No. 3,751,137, and assigned to the common assignee for a similar device.

As is well known, the liquid crystal material interposed between the inner surfaces of plates 10 and 12 is normally transparent. When an electric potential is applied across a particular area thereof, such an area becomes opalescent and scatters incident light. Accordingly, a potential difference may be selectively applied between one or more of the electrically conductive segments on the front plate and one or more of the other of the common electrode segments on the back plate. In response to the potential difference, the interposed nematic liquid crystal is activated to provide a visually distinguished display.

The apparatus may be either transmissive or reflective as described in the above-mentioned copending applications. For a transmissive display, electrodes on both the front and back plate are made of transparent material, such as tin oxide or the like. For a reflective display, the electrode segments on the front plate are made of the same transparent material whereas the common electrode segments on the back plate are made of a reflective material such as gold plate for example. If deemed necessary or desirable, areas of the back plate not covered by the common electrode segments of a reflective display may be likewise covered with electrically inactive reflective material such as the gold of which the common electrodes are formed, but which is electrically isolated from the electrically energizable common electrode segments.

In accordance with the present invention, there is provided a method of displaying numerals on liquid crystal display panels using the electrical equivalent of seven electrode segments. The segments are arranged so that the numeral "1" appears centered in the display area and the main vertical part of the numeral "4" bisects the horizontal part thereof, as illustated in FIG. 5. In accordance with this arrangement, there is employed a back electrode pattern comprising first and second common electrodes A and B on the back plate for each of the character patterns on the front plate, instead of a single common electrode as used in prior art displays. Nevertheless, the first common electrode, e.g. electrode A, of each of the character patterns is connected to a common circuit point, e.g. circuit point 28. That is, all of the common electrodes are interconnected in electrical parallel. Likewise, the second common electrode (B) of each character pattern is electrically interconnected (e.g. at node 26). Thus, only a single additional external lead is necessary for the entire display regardless of the number of character patterns on the display. Conversely, if an eight-segment approach is used to obtain a centered "1" for such a display, an extra lead is required for each and every character pattern employed (when compared with the number of leads used for the conventional seven-segment pattern).

Figure 3:
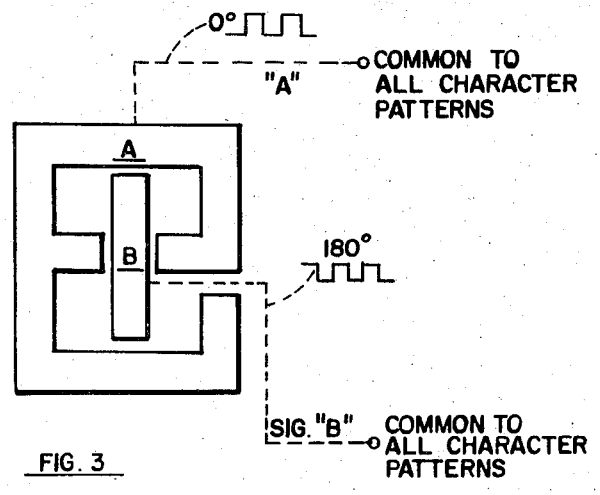
FIG. 3 illustrates an exemplary pattern of conductive character segments.

The back or common electrodes A and B are shown in FIG. 3. The back electrodes are positioned and formed on plate 12 in a pattern to register with the character pattern of electrode segments on the front plate 10. As can be readily seen, first common electrode A has a configuration that causes it to be in registration with a first part of the character pattern of FIG. 4. For example, common electrode A is in substantial registration with all of the segments (1a through 7) except the center, vertical electrode segment 1b. Second common electrode B in FIG. 3 is positioned to be in registration with a second part of the character pattern illustrated in FIG. 4. Such second part comprises the vertical, center electrode segment 1b of the character pattern on plate 10.

Figure 4:
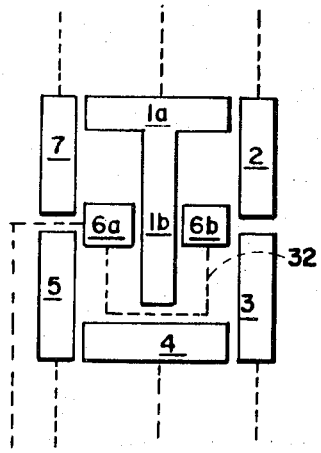
FIG. 4 illustrates a pair of discrete common electrode segments specifically arranged for registration with respective parts of the segmented pattern of FIG. 3.

As illustrated in FIG. 4, each character pattern on the inner surface of front plate 10 has seven electrode segments 1 through 7. Segment 1, the uppermost segment, includes sections 1a and 1b that are mutually angulated, collectively forming a T-shaped electrode. Similarly, segment 6 is formed of a pair of mutually discrete segments 6a and 6b which are electrically interconnected by conductor 32.

Accordingly, it will be seen that by appropriate electrical energization of one of the common electrode segments A or B, together with concurrent appropriate electrical energization of a selected group of character electrode segments 1–7 on front plate 10, different ones of a plurality of specific characters may be caused to be displayed by activation of interposed liquid crystal material.

Stated in another fashion, first common i.e. electrode, electrode A, is in registration with a first set of conductive character electrode segments. Second common electrode, electrode B, is in registration with character electrode segments that are excluded from the first set of electrode segments. Such first set comprises character segments 2 through 7 inclusive, together with section 1a of segment 1.

In one embodiment, both the selected conductive character electrode segments on front plate 10 and the common electrode segments on back plate 12 are electrically energized with a square wave signal. It is desirable, for display of a specific numeral, to selectively activate a group of conductive character segments of front plate 10 with a square wave signal that is of opposite phase with respect to the phase of a similar square wave signal concomitantly employed to activate the common electrode that is in registration with the selectively activated group of conductive character segments. The two common electrode segments A and B are at all times during operation of the apparatus, energized with square wave signals of mutually opposite phase. Accordingly, those conductive character electrode segments on front plate 10 that are not to be employed for display of the specific number at a given instant, are activated with a signal that is in phase with the signal applied to the common electrode segment in registration therewith. In other words, to activate the liquid crystal material in a specific configuration, the electrode segments on both sides thereof and in registration with each other are energized by mutually opposite phase signals. Conversely, the remaining electrodes on either side of the liquid crystal material are energized with like phase signals. The liquid crystal material, of course, has the characteristic of being activated when electrodes on opposite sides thereof are energized with different phases to produce a potential difference thereacross. When the electrodes on opposite sides of the interposed liquid crystal material are unenergized or energized at the same potential (as by energization with signals of like phase), the liquid crystal material remains in its inactive state.

Figure 5:
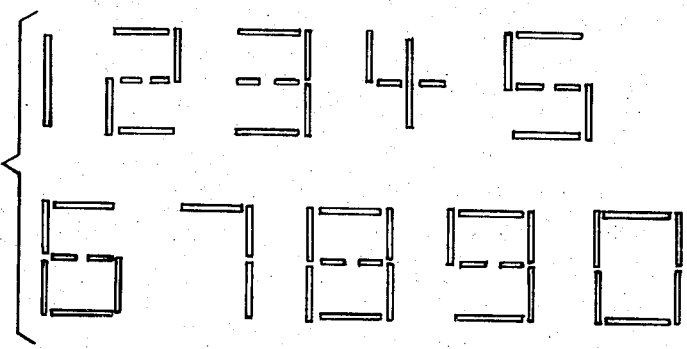
FIG. 5 illustrates a font of segmented numerals that may be displayed with the character pattern and common electrode segments of FIGS. 3 and 4.

FIG. 5 illustrates a font of numerals 0 through 9 which can be displayed with the energization of the appropriate character electrode segments formed in the pattern illustrated in FIG. 4, together with the common electrode pattern shown in FIG. 3. Table I, set forth below, shows the respective signal phases applied to the several electrode segments of the character pattern shown in FIG. 3 to achieve each of the ten arabic numerals illustrated in FIG. 5. As previously described, the two common electrodes A and B are supplied with square wave signals of mutually opposite phase. These signals are designated as signals A and B and are applied to common electrodes A and B, respectively. Consequently, by identifying the signal applied to each electrode segment of the character pattern, the displayed character can be determined. Thus, in Table I, the letter "A" indicates the application of a signal A to an electrode segment. Signal A is, therefore, in phase with the signal applied to common electrode but in phase opposite to signal applied to common electrode B. This signal is applied to the designated electrode segment. Thus, a segment indicated to be energized by signal A in Table I will activate the liquid crystal material interposed between such segment and common electrode B. Similarly, the letter "B" denotes energization of the designated electrode segment with a signal that has a phase similar to the signal applied to common electrode B but opposite to the signal energizing common electrode A. Thus, whenever a "B" appears in Table I, the appropriate electrode segment and common electrode A will operate to activate liquid crystal material interposed therebetween.

TABLE I

|  |  | Numeral |
|---|---|---|
|  |  | 1 2 3 4 5 6 7 8 9 0 |
|  | 1 | A B B A B B B B B B |
|  | 2 | A B B A A A B B B B |
| Electrode | 3 | A A B A B B B B B B |
| Segment | 4 | A B B A B B A B B B |
|  | 5 | A B A A A B A B A B |
|  | 6 | A B B B B B A B B A |
|  | 7 | A A A B B B A B B B |

For example, application of the "A" signal to electrode segments 1–7 causes the numeral 1 to be displayed. That is, all of segments 1–7 receive a signal which is out of phase with the signal supplied to electrode B but in phase with the signal supplied to electrode A. Consequently, only the liquid crystal material interposed between common electrode B and electrode segment 1 (section 1b) is activated. Likewise, application of the "B" signal to electrode segments 1, 2, 4, 5 and 6 (sections 6a and 6b) will create a potential difference relative to common electrode A such that a numeral 2 is displayed. Other display patterns are readily ascertainable from Table I.

Figure 6:
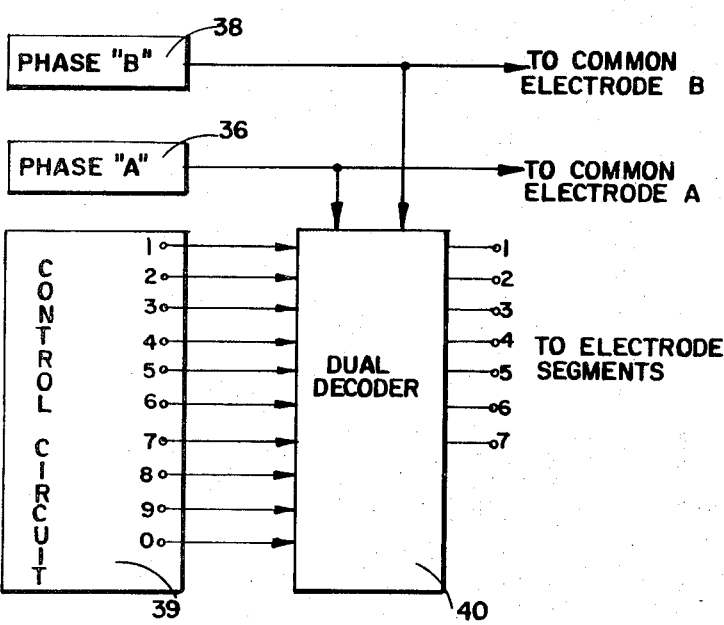
FIG. 6 illustrates a decoding arrangement for energizing the display electrodes.

Although it will be readily appreciated that many different arrangements may be employed for providing the appropriate phase signals to the various character electrode segments and to the common electrode segments, the one arrangement is schematically indicated in FIG. 6. First and second sources 36 and 38 of mutually opposite phase signals are fed to dual decoder 40. Decoder 40 has seven output leads each of which is individually connected to a respective one of the seven character electrode segments of a given character pattern. There is one such dual decoder for each character pattern in the entire display. The input signals to dual decoder 40 are in the form of number selection signals provided on a given one of ten input leads thereto. These signals are supplied by suitable control circuitry 39 such as a calculator or the like. Each of the sections of the decoder operates just as the other and will supply the phase A signal to a combination of the decoder output leads in accordance with a selection dictated by energization of appropriate input leads of the decoder. Energization of the same input of the decoder will also cause the decoder to feed the phase B signal to the appropriate combination of its output leads. For example, where the input lead of the decoder corresponding to numeral "4" is activated, output leads 6 and 7 (see Table I) are caused to receive a B signal. Conversely, output leads 1, 2, 3, 4 and 5 are caused to receive the A signal. As previously mentioned, phase A and phase B signals are individually fed continuously to the respective common electrodes A and B. Therefore, segments 6 and 7 and section 1a of segment 1 (in cooperation with the back electrodes) will activate the liquid crystal material. For the number "1," all seven character segments receive the signal that is in phase with the signal applied to common electrode A so that only section 1b of segment 1 will activate the crystal material.

Figure 7:
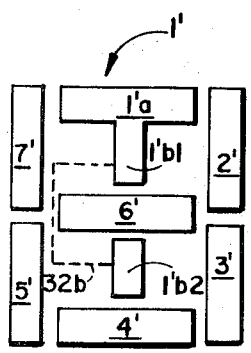
FIG. 7 illustrates a modified form of segmented character pattern.

Illustrated in FIG. 7 is an alternate arrangement of the conductive character segments employing segments 1', 2', 3', 4', 5', 6' and 7'. In this arrangement, the horizontal segment 6' is a single section and the intersecting center vertical section of segment 1' is made in two parts 1'b1 and 1'b2, respectively, above and below the continuous horizontal segment 6'. As in the arrangement of FIG. 4, segment 1' is made with two mutually angulated and electrically interconnected sections 1'a and 1'b. The latter is made in two parts 1'b1 and 1'b2 that are electrically interconnected by conductor 32b. With the electrode arrangement shown in FIG. 7, the pattern of first and second common electrodes illustrated in FIG. 3 may be employed. If deemed necessary or desirable, the pattern of the first and second common electrodes may be modified to more closely conform to the modified pattern of FIG. 7. For example, common electrode B may be made in two parts respectively above and below the continuous intermediate horizontal part of the common electrode A.

Figure 8:
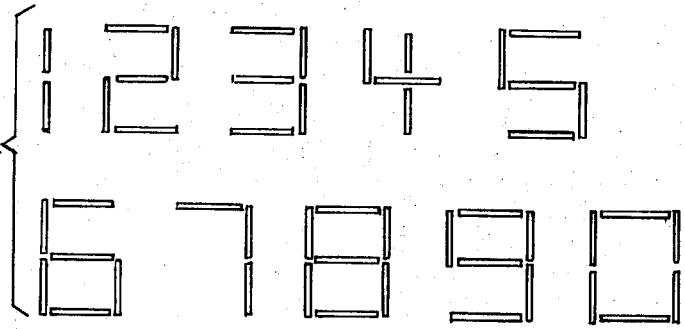
FIG. 8 illustrates a font of numerals that may be formed by the character pattern of FIG. 7.

With the conductive character segment pattern of the type shown in FIG. 7, the display provides a font of numerals as shown in FIG. 8. The relative phasing of the conductive character segments of first and second common electrodes will remain substantially the same as described in connection with the first-mentioned pattern of FIG. 3.

Figure 9:
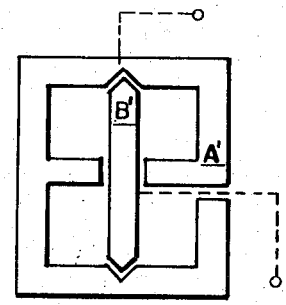
FIG. 9 illustrates a modified version of the pattern of conductive character segments shown in FIG. 3.

Referring now to FIG. 9, there is shown another arrangement of common back electrodes. This arrangement is similar to the common electrode arrangement shown in FIG. 3. However, center vertical segment B is elongated and outer segment A is notched. The purpose of this arrangement is to permit the numeral "1" and the vertical bar of the numeral "4" to be extended. Normally, there is no difficulty with the short bar in the numeral "4." However, a shorter numeral "1" may be undesirable. Of cosure, if the common electrode B' is elongated and common electrode A' is notched, numerals with top or bottom horizontal bars will be affected. Nevertheless, the effect may not be unpleasant to the observer. A separate showing of font is deemed unnecessary for this explanation.

Except for the unique configuration of conductive character segment patterns and common electrode patterns described herein, the liquid crystal display panel built according to the present invention will be manufactured and assembled following the several steps and employing the similar or identical components and compositions described in detail in the above-mentioned copending applications.

There have been described various segmented character patterns and novel numeral fonts which permit more evenly spaced character displays with a centered "1" and with a "4" having a vertical part intersecting its horizontal part.

The foregoing detailed description is to be understood as given by way of illustration and example only. The spirit and scope of this invention is limited solely by the appended claims.

What is claimed is:
1. In a liquid crystal display comprising
  first and second plates at least one of which is transparent, said plates having mutually facing inner surfaces,
  means for holding said plates in mutually spaced face-to-face juxtaposition to define a sealed chamber between said inner surfaces,
  a liquid crystal material confined in said chamber, at least one plurality of mutually discrete character electrode segments on the inner surface of said first plate to collectively form a character pattern in which different combinations of said electrode segments form respective ones of a plurality of characters, and at least one discrete electrically conductive common electrode on the inner surface of said second plate, the improvement comprising said common electrode including at least first and second discrete portions, said first portion of said common electrode in registration with a first part of said character pattern, said second portion of said common electrode in registration with a second part of said character pattern, said first portion of said common electrode arranged generally in the form of a figure 8, said second portion of said common electrode arranged to extend through the vertical center of said first portion, said first part of said character pattern arranged generally in the form of a figure 8, said second part of said character pattern including a first segment which has a generally T-shaped configuration arranged to extend through at least a portion of the vertical center of said first part.

2. The display recited in claim 1 wherein said first segment includes a plurality of discrete sections which are electrically connected.

3. The display recited in claim 2 including means for selectively applying signals to said common electrodes and said character electrode segments to activate portions of said liquid crystal material.

* * * * *